(12) United States Patent
Macwan et al.

(10) Patent No.: US 8,891,745 B2
(45) Date of Patent: *Nov. 18, 2014

(54) METHODS, SYSTEMS, AND COMPUTER PROGRAM PRODUCTS FOR DETERMINING TARGETED CONTENT TO PROVIDE IN RESPONSE TO A MISSED COMMUNICATION

(71) Applicant: AT&T Intellectual Property I, L.P., Atlanta, GA (US)

(72) Inventors: Sanjay Macwan, Marlboro, NJ (US); Gokul Singaraju, Edison, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/016,160

(22) Filed: Sep. 2, 2013

(65) Prior Publication Data

US 2014/0012675 A1 Jan. 9, 2014

Related U.S. Application Data

(63) Continuation of application No. 13/165,183, filed on Jun. 21, 2011, now Pat. No. 8,526,586.

(51) Int. Cl.
| | |
|---|---|
| *H04M 15/00* | (2006.01) |
| *H04M 3/42* | (2006.01) |
| *G06Q 30/02* | (2012.01) |
| *H04W 4/24* | (2009.01) |

(52) U.S. Cl.
CPC .............. *H04W 4/24* (2013.01); *G06Q 30/0267* (2013.01); *H04M 2215/0192* (2013.01)

USPC .................................. 379/114.13; 379/210.01

(58) Field of Classification Search
USPC ............... 379/114.1, 114.12, 114.13, 121.02, 379/210.01
See application file for complete search history.

(56) References Cited

U.S. PATENT DOCUMENTS

| | | |
|---|---|---|
| 5,740,229 A | 4/1998 | Hanson et al. |
| 6,084,628 A | 7/2000 | Sawyer |
| 6,775,365 B1 | 8/2004 | Norby |
| 6,947,531 B1 | 9/2005 | Lewis et al. |
| 8,526,586 B2 * | 9/2013 | Macwan et al. ......... 379/114.13 |
| 2002/0136377 A1 | 9/2002 | Stewart et al. |

OTHER PUBLICATIONS

Ad-Supported Free Telephone Calls: Science Fiction in the News, www.technovelgy.com (Jan. 12, 2011).
Sikes, Sharla, Ad-Supported Calling Gains Momentum, www.aboutvoip.org (Oct. 25, 2007).
iCall; Make and receive free phone calls, http://icall.com/about/ (Feb. 23, 2011).
What's Inuvi? A Brief Q&A, http://blog.inuvi.com (Jan. 8, 2011).
Poe, Robert, "Ring Plus Offers Free Ad-Supported Calling", www.voip-news.com (Oct. 27, 2008).

(Continued)

*Primary Examiner* — Quoc D Tran
(74) *Attorney, Agent, or Firm* — Parks IP Law LLC; Li K. Wang, Esq.

(57) ABSTRACT

Targeted content is provided to at least one communication device responsive to a notification of a missed communication. Responsive to a notification of the missed communication, a selection of one of a plurality of different pricing options is received for a return communication. Targeted content is provided, in addition to content of the return communication, based on the selected pricing option.

20 Claims, 6 Drawing Sheets

MISSED CALLS 310

| CALLER ID PHOTO ADDRESS | PHONE NUMBER | DATE/TIME OF CALL | RETURN CALL/SMS | CALL BACK FREE | CALL BACK COLLECT |
|---|---|---|---|---|---|
| JOHN DOE ABC LTD. NJ, USA | (425) 814-2020 | 10:04 am | | (425) 814-2020 | (425) 814-2020 |
| TOM ALLEN XYZ CORP. WASHINGTON, DC | (891) 319-6947 | 3/14/2011 11:10:09 | | (891) 319-6947 | (891) 319-6947 |
| VICTOR LONG MIDTOWN, NY | (111) 111-1111 | 3/14/2011 08:10:09 | | (111) 111-1111 | (111) 111-1111 |

(56) References Cited

OTHER PUBLICATIONS

Dolcourt, Jessica, "Vringo video ringtones, the ultimate caller ID", http://reviews.cnet.com (Oct. 25, 2007).
AndroidTapp.com: Android App Review—Video Caller ID (Oct. 4, 2010).
Cheng, Jacqui, "No dime needed: companies trying free, ad-supported mobile and VoIP service", http://arstechnica.com (Sep. 25, 2007).
Video Caller ID 2.3.4 for BlackBerry, Javatek Media, http://download.cnet.com (Feb. 23, 2011).
Prakash, Ravi, "Free audio and video Calls, is it possible?", http://trak.in (Sep. 6, 2010).
Google Gmail Adds Skype-Like Call Features; Will Ad-Supported Calls Follow? www.unboundedition.com, Abstract only (Aug. 25, 2010).
Tabini, Marco, "iPhone VoIP apps now offer calling over 3G network", www.macworld.com (Jan. 28, 2010).

\* cited by examiner

*FIG. 3A*

MISSED CALLS 310

| CALLER ID PHOTO ADDRESS | PHONE NUMBER | DATE/TIME OF CALL | RETURN CALL/SMS | CALL BACK FREE | CALL BACK COLLECT |
|---|---|---|---|---|---|
| JOHN DOE ABC LTD. NJ, USA | (425) 814-2020 | 10:04 am | | (425) 814-2020 | (425) 814-2020 |
| TOM ALLEN XYZ CORP. WASHINGTON, DC | (891) 319-6947 | 3/14/2011 11:10:09 | | (891) 319-6947 | (891) 319-6947 |
| VICTOR LONG MIDTOWN, NY | (111) 111-1111 | 3/14/2011 08:10:09 | | (111) 111-1111 | (111) 111-1111 |

*FIG. 3B*

CONTACTS 320

| FIRST NAME LAST NAME PHOTO COMPANY ADDRESS | WORK PHONE NUMBER | EMAIL | MOBILE PHONE NUMBER CALL/SMS | CALL BACK FREE | CALL BACK COLLECT |
|---|---|---|---|---|---|
| ANITA WELLS MNO LTD. NY, USA | (525) 814-4440 | mary@yhoo.com | (123)456-7890 <br> (123)456-7890 | | |
| JOHN DOE ABC LTD. NJ, USA | (234) 567-8901 | john@google.com | (425)814-2020 <br> (425)814-2020 | (425) 814-2020 | (425) 814-2020 |
| PARK SMITH LKM CORP. WA, USA | (325) 514-2120 | parks@yhoo.com | (321)456-7890 <br> (123)456-7890 | | |
| TOM ALLEN XYZ CORP. WASHINGTON, DC | (456) 213-7890 | tom@hotmail.com | (891)319-6947 <br> (891)319-6947 | (891) 319-6947 | (891) 319-6947 |

METHODS, SYSTEMS, AND COMPUTER PROGRAM PRODUCTS FOR DETERMINING TARGETED CONTENT TO PROVIDE IN RESPONSE TO A MISSED COMMUNICATION

TECHNICAL FIELD

The present disclosure relates generally to telecommunications, and, more particularly, to providing targeted content.

BACKGROUND

In emerging countries and areas where the use of prepaid wireless calling plans is on the rise, callers have found ways to communicate using phone networks while avoiding paying for call charges. One way in which callers avoid such charges is by using a "Missed Call" message to communicate information. A caller may call a party, let the called party's phone ring, and then end the call before the called party answers. A "Missed Call" message will be displayed on the called party's phone, showing that the caller made the call. The "Missed Call" message often has a meaning to both the caller and the called party.

For example, a parent may instruct a teenage child to call once he or she has reached a destination. The parent may wish to avoid incurring service charges for the call, e.g., if the child is traveling to an area in which extra service charges would be applied for roaming. So, the parent may instruct the child to simply hang up, e.g., after the second ring if the destination is reached safely. When the child reaches the destination safely, calls the parents, and disconnects the call after the second ring, a "Missed Call" message will be displayed on the parent's phone. This serves as a message to the parent that the child has reached his or her destination safely.

A disconnected call does not incur any billing charges but does consume network resources. The burden on network resources is expected to grow as the use of the "Missed Call" messaging gains widespread use.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of the present disclosure.

According to an exemplary embodiment, a method is provided for determining targeted content. The method includes receiving a selection of one of a plurality of different pricing options for a return communication responsive to a notification of a missed communication. The missed communication is from a second communication device to a first communication device, and the return communication is from the first communication device to the second communication device. Targeted content to provide to at least one of the communication devices is determined, in addition to content of the return communication, based on the selected pricing option.

According to another embodiment, a device is provided for determining targeted content. The device includes an interface configured to receive a selection of one of a plurality of different pricing options for a return communication responsive to a notification of a missed communication. The missed communication is from a second communication device to a first communication device, and the return communication is from the first communication device to the second communication device. The device also includes a processor configured to determine targeted content to provide to at least one of the communication devices, in addition to content of the return communication.

According to another embodiment, a computer program product includes a storage medium upon which instructions are recorded that, when executed by a processor, perform acts for determining targeted content. The acts include receiving a selection of one of a plurality of different pricing options for a return communication responsive to a notification of a missed communication. The missed communication is from a second communication device to a first communication device, and the return communication is from the first communication device to the second communication device. Targeted content to provide to at least one of the communication devices is determined, in addition to content of the return communication, based on the selected pricing option.

BRIEF DESCRIPTION OF THE DRAWINGS

FIGS. 3A and 3B illustrate exemplary user interfaces for communication devices according to an exemplary embodiment.

DETAILED DESCRIPTION

Detailed exemplary embodiments are disclosed herein. It must be understood that the embodiments described and illustrated are merely examples that may be embodied in various and alternative forms, and combinations thereof. As used herein, the word "exemplary" is used expansively to refer to embodiments that serve as examples or illustrations. The figures are not necessarily to scale and some features may be exaggerated or minimized to show details of particular components. Specific structural and functional details disclosed herein are not to be interpreted as limiting.

According to an exemplary embodiment, some of the cost of network utilization for a missed communication may be recouped by providing targeted content, such as paid advertisements, as part of a return communication. According to one aspect, responsive to a notification of a missed call from a caller, a called party may make free calls or collect calls. In exchange for listening and/or viewing targeted content, the called party and/or caller may be connected for a predetermined time period, which may be limited. After the predetermined time period, the caller/callee may decide to continue the call for a fee or in exchange for listening/viewing additional targeted content or end the call.

For the purposes of this disclosure, the terms "call" and "communication" include not only voice calls but also video calls and/or audio/video calls made via wireless and/or wireline networks. Additionally, the terms "targeted content", "advertisement" and "ad" include not only retail advertisements but also public service announcements, etc.

Figure 1A:
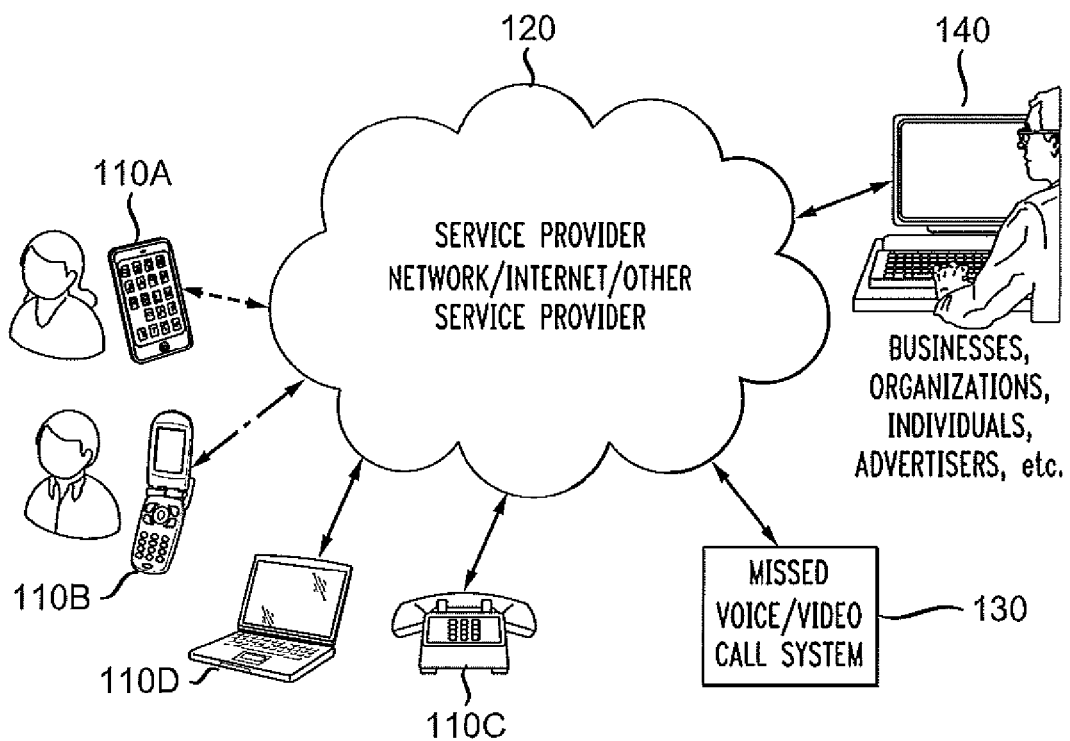
FIG. 1A illustrates an exemplary system in which targeted content may be provided responsive to a missed communication according to an exemplary embodiment.
Figure 1B:
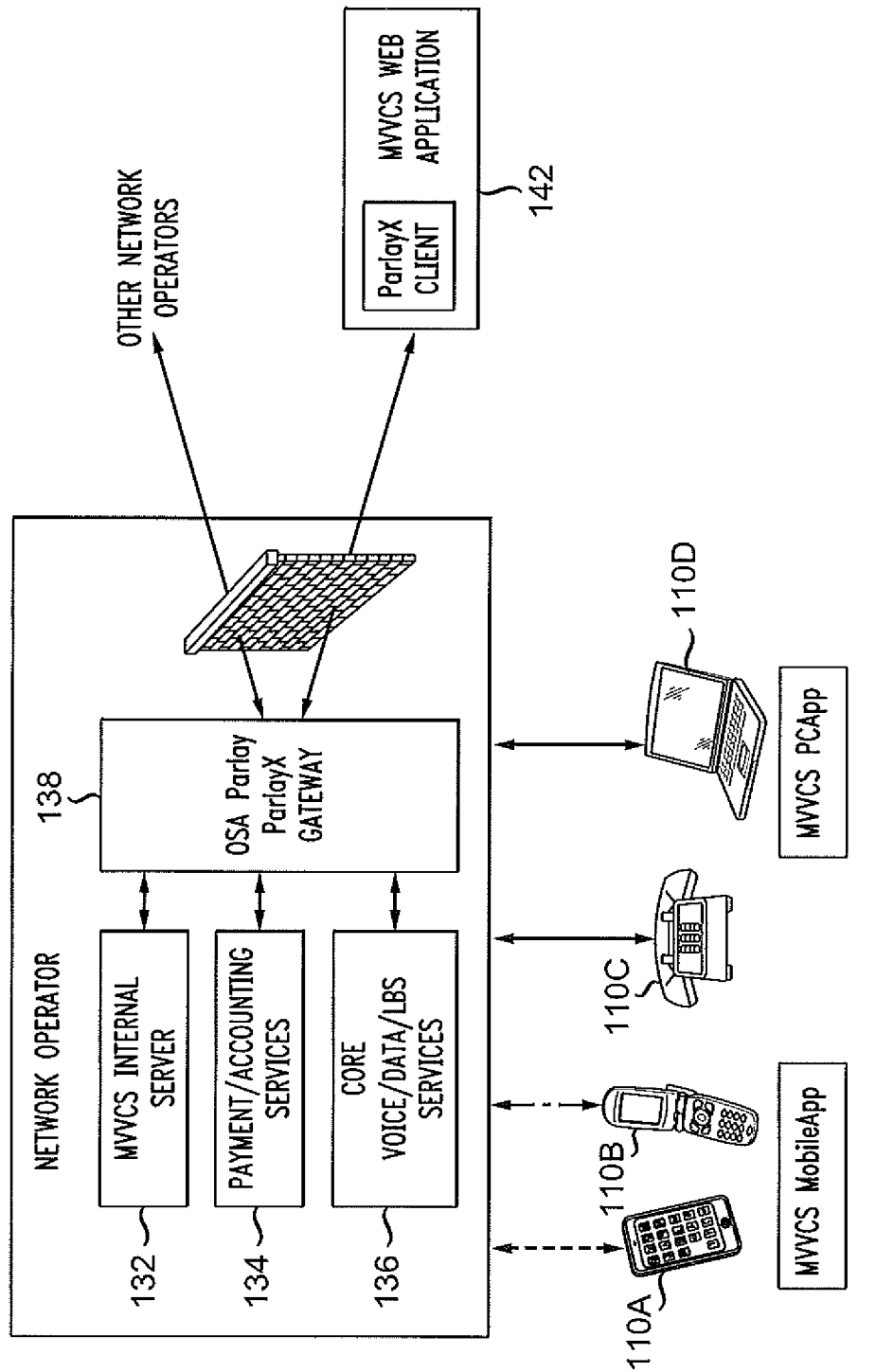
FIG. 1B illustrates details of an exemplary system for determining targeted content to provide responsive to a missed communication according to an exemplary embodiment.

FIG. 1A illustrates an exemplary system in which targeted content may be provided responsive to a missed communication according to an exemplary embodiment. In the system shown in FIG. 1A, communication devices 110A, 110B, 110C, and 110D communicate with a missed call system, e.g., the missed voice/video call system (MVVCS) 130, via a network 120. The MVVCS 130 may be included as a component of a service provider/network operator system (as shown in FIG. 1B) or may be provided as a third party component. The MVVCS 130, in turn, communicates with a targeted content provider 140 via the network 120.

The communication devices may include, e.g., wireless telephones, such as devices 110A and 110B, a wireline telephone 110C (e.g., Voice Over Internet Protocol (VoIP) or analog), and/or a laptop, desktop, or tablet computer 110D. The communication devices 110A, 110B, 110C and 110D may be implemented as communication devices, such as the device 110 described in detail below with reference to FIG. 2. Although four communication devices are shown in FIG. 1A for illustrative purposes, it should be appreciated that any number of communication devices may communicate and/or be provided with targeted content in the manner set forth in this disclosure.

The network 120 may include one or more service provider networks, e.g., carrier networks, and/or the Internet. The network 120 may be implemented as one or more wireless networks and/or wireline networks. The network may include, e.g., Global System for Mobile communications (GSM) networks, Universal Mobile Telecommunications Systems (UMTS) networks, WiFi network, WiMax networks, POTS networks, VoIP networks, etc. It should be understood, however, that the embodiments may be implemented in other communication networks that use any existing or yet to be developed telecommunications technology. Some examples of other suitable telecommunication technologies include, but are not limited to, networks utilizing Time Division Multiple Access (TDMA), Frequency Division Multiple Access (FDMA), Wideband Code Division Multiple Access (WCDMA), Orthogonal Frequency Division Multiplexing (OFDM), Long Term Evolution (LTE), and various other 2 G, 2.5 G, 3 G, 4 G, and grater generation technologies. Examples of suitable data bearers include, but are not limited to General Packet Radio Service (GPRS), Enhanced Data rates for Global Evolution (EDGE), the High-Speed Packet Access (HSDPA) protocol family, such as High-Speed Downlink Packet Access (HSDPA), Enhanced Uplink (EUL) or otherwise termed High-Speed Uplink Packet Access (HSUPA), Evolved HSPA (HSPA+) and various other current and future data bearers.

According to an exemplary embodiment, a business, organization, individual, government entity, or advertiser may upload targeted content, e.g., audio and/or video content, via the content provider 140. The content provider 140 may include a server hosting a website that may be accessed by a user for uploading the targeted content. The uploaded targeted content is selected by the MVVCS 130 to provide to users of the communication devices 110A, 110B, 110C, and/or 110D in addition to content of a return communication responsive to a missed communication. Alternatively, or in addition, targeted content may be uploaded directly to the MVVCS 130. The targeted content may be selected based on a pricing option selected by a caller and/or callee(s) for a return communication, user profile of the caller and/or the callee(s), type/content of the missed call and/or return call, date/time of the missed call and/or the return call, and/or geographic location(s) of the caller and/or the callee(s). The geographic location may be determined in any of a variety of ways, including but not limited to, a global satellite system (GPS) (not shown for simplicity of illustration). The user profile may include, e.g., age, gender, social interests, shopping preferences, residential area, etc.

According to an exemplary embodiment, targeted content is provided only to users who have opted-in to a missed call targeted content service. In one embodiment, users may opt-in and opt-out of the targeted content service or drop calls at any time. For example, users may opt-in/opt-out of the missed call targeted content service upon registering with a service provider or via customer support (e.g., phone or web-based). A user may also opt-in/opt-out via, e.g., a phone settings menus, missed call application settings, etc. on the user's communication device, or by sending opt-in/opt-out messages via, e.g., SMS shortcode.

According to an exemplary embodiment, a user of a communication device, e.g., mobile communication device 110A or 110B, receives a call on his/her communication device, and the call ends after one or a few rings and before the call is picked up or the call is handled by voicemail. The call recipient may be notified of the missed call, e.g., by hearing the ring and/or via a display of a user interface. For example, the call may be listed as a missed call in a recent call log user interface on the communication device. An example of such an interface is shown in FIGS. 3A and 3B. The missed call may be highlighted, e.g., in red. A similar interface may be presented to a user of a laptop 110D. For a legacy communication device, e.g., the wireline phone 110C, the missed call list may be maintained by the service provider/carrier or other entity and may be accessed by the user calling a telephone number, e.g., a 1-800-MVVCS number, at a voice prompt. Alternatively, the communication devices 110C and 110D may use modem interfaces to call a 1-800-MVVCS number via the Internet. This communication may be provided using Representational State Transfer (REST) client-server architecture which governs the behavior and communication of servers, gateways, proxies, and clients via the Internet.

Options may be provided to the users of the communication devices 110A, 110B, 110C, and 110D for returning a missed call. In one embodiment, there are two primary options for returning the missed call, i.e., as a free return call or as a collect call. When a user selects a call back free (CBF) option, a tariff-free voice/video call is provided by the network 120. When a user selects a call back collect (CBC) option, a tariff for the call is billed to the callee.

The MVVCS 130 receives selections of the CBF or CBC option from a caller wishing to initiate a return call. The MVVCS 130 verifies the identity and obtains the profile of the caller initiating the return call, accepts the request by the caller to initiate the return call, determines what targeted content to provide, when to provide the targeted content, and what party to provide the targeted content to in addition to the content for the return communication.

According to an exemplary embodiment, the MVVCS 130 provides targeted content before and/or during a return communication, as described in detail below. For example, for an audio call, targeted audio advertisements are provided to the caller before or while the return communication to the callee is initiated. For a video call, targeted audio/video ads may be sent to the caller before or while the callee's destination phone numbers are verified and dialed. In one embodiment, the caller's voice and/or image is muted while the targeted ad is presented.

For a free call, each callee who has opted into the targeted content service may be provided with an audio and/or video indication of the return call, e.g., a text indication before a CallerID indicating that the call is a free return call and/or a special ringtone, and targeted content may be sent to the callee. For a collect call, for each callee who has opted into the service, an audio and/or video indication of the collect call to be billed to the callee is given, e.g., via a text indication before a CallerID indicating that the call is a collect return call and/or a special ringtone, and the callee(s) may be muted for the duration of the targeted content. At the end of the targeted content duration, the caller and callee(s) may be unmuted, and the return communication is established for a predetermined amount of time. At the end of the predetermined amount of time, the call may be dropped, or an option may be provided to the caller and/or callee(s) to continue the call with additional targeted advertising, pay for call, or drop the call. Additional examples for targeted content delivery are provided below.

The MVVCS 130 may be implemented as one or more devices, such as the device 400 described in further detail below with reference to FIG. 4. Although not illustrated, the content provider 140 may include a server that is implemented in a manner similar to that described below with reference to FIG. 4. The MVVCS 130 may be a third party component and/or may perform similar functions as and include a server that is internal to a network operator system, e.g., the server 132 shown in FIG. 1B. The MVVCS 130 may also include additional servers, external to a network operator system, for load balancing.

FIG. 1B illustrates details of a system for determining targeted content to provide responsive to a missed communication according to an exemplary embodiment. As shown in FIG. 1B, the content provider may include a client 142, e.g., a ParlayX web application client, which may operate on a server. The client application 142 interfaces with the MVVCS internal server 132 included in the network operator system.

The network operator system also includes a gateway 138, e.g., an OSA Parlay gateway, with which the MVVCS internal server 132 communicates through a firewall with the client 142 to manage the overall targeted content delivery and call sequence. According to an exemplary embodiment, the communication may be handled by a REST API. The client 142, gateway 138, and MVVCS internal server 132 may operate according to, e.g., the ParlayX 3.0 Specification, the details of which may be found, e.g., at http://docbox.etsi.org/TISPAN/OPEN/OSA/ParlayX30.html.

According to an exemplary embodiment, once a user is notified of a missed communication and selects an option, e.g., the CBC or CBF option, for a return communication, a secure REST session may be invoked with one or more MVVCS external servers (not shown in the interest of simplicity of illustration) for load balancing. The external server verifies the REST call and receives the destination phone numbers. Alternatively, the MVVCS internal server 132 may perform call verification and receive the destinations phone numbers for a REST session.

The MVVCS internal server 132 manages billing for free calls and MVVCS collect calls, communicates with external operators and/or servers (as appropriate) and the client 142 as needed, obtains current information regarding the status and the locations of the communication devices 110A, 110B, 110C, and 110D, and updates and maintains user profiles. The user profiles are used to determine targeted content to provide to the users. The MVVCS internal server 132 monitors the call content of a communication, e.g., whether the call is voice and/or video, keywords in the call, etc., and updates the user profile based on call content, such that targeted content may also be provided based on call content.

The content provider 140 may include a web application component 142 that allows advertisers and other targeted content providers to register with the targeted content service, make payments and upload advertisement content. Such an application may also be included in the MVVCS 130.

The network operator system also includes a payment/accounting system 134 for handling billing and payment in conjunction with the MVVCS internal server 132 and a core voice/data/location based server system 136 for handling the core exchange of information.

The MVVCS internal server 132 may be implemented with a device, such as that described below with reference to FIG. 4. For network load balancing, additional servers may be used, e.g., external MVVCS servers. Such servers may also be implemented as described below with reference to FIG. 4.

Figure 2:
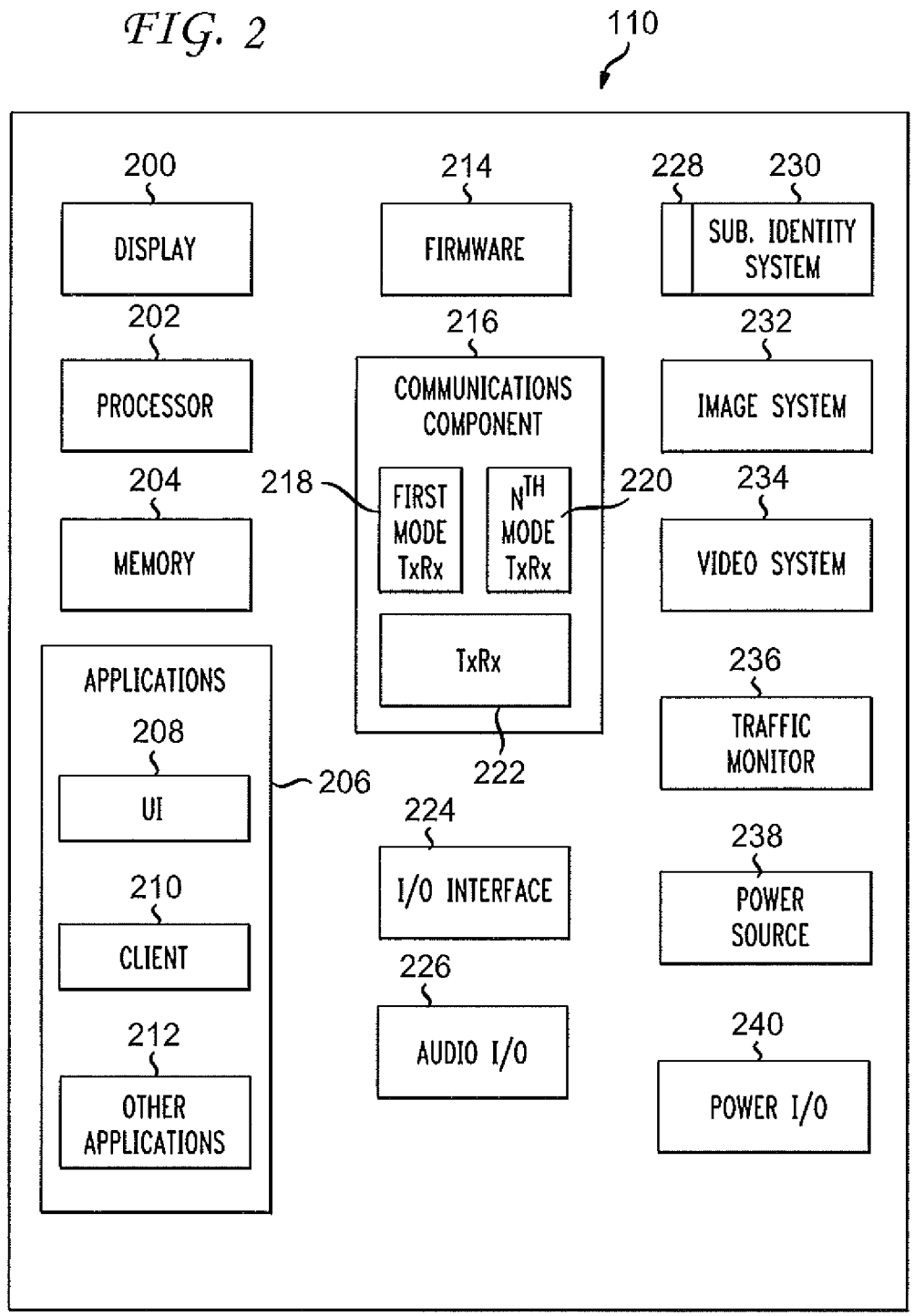
FIG. 2 illustrates an exemplary communication device according to an exemplary embodiment.

FIG. 2 illustrates a schematic block diagram of an exemplary device 110 according to exemplary embodiments. Although no connections are shown between the components illustrated in FIG. 2, those skilled in the art will appreciate that the components can interact with each other via any suitable connections to carry out device functions.

It should be understood that FIG. 2 and the following description are intended to provide a brief, general description of a suitable environment in which the various aspect of some embodiments of the present disclosure can be implemented. While the description includes a general context of computer-executable instructions, the present disclosure can also be implemented in combination with other program modules and/or as a combination of hardware and software. The term "application", or variants thereof, s used expansively herein to include routines, program modules, program, components, data structures, algorithms, and the like. Applications can be implemented on various system configurations, including single-processor or multiprocessor systems, minicomputers, mainframe computers, personal computers, handheld-computing devices, microprocessor-based, programmable consumer electronics, combinations thereof, and the like.

Referring to FIG. 2, a device 110 may be a multimode handset and can include a variety of computer-readable media, including volatile media, non-volatile media, removable media, and non-removable media. The term "computer-readable media" and variants thereof, as used in the specification and claims, can include storage media. Storage media can include volatile and/or non-volatile, removable and/or non-removable media, such as, for example, RAM, ROM, EEPROM, flash memory or other memory technology, CDROM, DVD, or other optical disk storage, magnetic tape, magnetic disk storage, or other magnetic storage devices or any other medium that can be used to store information that can be accessed by the device 110.

The device 110 may include a display 200 for displaying multimedia, such as, for example, text, images, video, and telephone functions, such as caller id data, setup functions, menus, music metadata, messages, wallpaper, graphics, Internet content, device status, preference settings, and the like.

According to exemplary embodiment, the display 200 may display targeted content delivered to the device 110 by the MVVCS 130. The display 200 may be an interactive touch screen or a screen that may be manipulated with a cursor, e.g., for receiving notification of missed calls and selecting missed calls to return from a missed call list or a contact lists and selecting, e.g., CBC or CBF options for initiating the return communication.

The device 110 may include a processor 202 for controlling and/or processing data. A memory 204 can interface with the processor 202 for the storage of data and/or applications 206.

The applications 206 may include, for example, SMS messaging software, EMS message software, MMS messaging software, USSD software, a WAP browser, and the like.

The applications 206 may also include a user interface (UI) application 208. The UI application 208 can interact with a client 210 (e.g., an operating system) to facilitate user interaction with device functionality and data. For example, the UI application 208 may be used for entering message content, viewing received messages, answering/initiating calls, entering/deleting data, password entry and settings, configuring settings, address book manipulation, and the like. Such user interaction may be facilitated via, e.g., a keypad or a touchscreen included in the device 110 or communicating with the device via the I/O interface 224. Also, according to exemplary embodiments, the UI application 208 can be used for selecting a missed call to return and a CBF and/or CBC option by a user of the device 110. Alternatively or in addition, such selections may be made via, e.g., an interactive voice response interface and/or a separate user interface and/or application.

The applications 206 may include other applications 212, such as, for example, add-ons, plug-ins, email applications, music application, video applications, camera applications, location-based service (LBS) applications, power conservation applications, game applications, productivity application, entertainment applications, combinations thereof, and the like, as well as subsystem and/or components.

The applications 206 can be stored in the memory and/or in firmware components 214 and can be executed by the processor 202. The firmware 214 can also store code for execution during initialization of the device 110.

A communications component 216 may interface with the processor 202 to facilitate wired/wireless communication with external systems including, for example, cellular networks, location systems, VoIP networks, local area networks (LAN's), wide area networks (WAN's), metropolitan area networks (MAN's), personal area networks (PAN's), and other networks, which may be implemented using WIFI, WIMAX, combinations and improvements thereof, and the like. The communications component 216 can also include a multimode communication subsystem for providing cellular communications via different cellular technologies. For example, a first cellular transceiver 218 can operate in one mode, for example, GSM, and an Nth transceiver 220 can operate in a different mode, for example UMTS. While only two transceivers 218, 220 are illustrated, it should be appreciated that a plurality of transceivers may be included. The communications component 216 may also include a transceiver 222 for other communication technologies, such as, for example, WIFI, WIMAX, BLUETOOTH, infrared, IRDA, NFC, RF, and the like. The communications components 216 may also facilitate reception from terrestrial radio networks, digital satellite radio networks, Internet based radio service networks, combinations thereof, and the like. The communications component 216 can process data from a network, such as, for example, the network 120, the Internet, a corporate network, a home broadband network, a WIFI hotspot, and the like via an ISP, DSL provider, or broadband provider.

An input/output (I/O) interface 224 may be provided for input/output of data and/or signals. The I/O interface 224 may be a hardwire connection, such as, for example, a USB, mini-USB, audio jack, PS2, IEEE 1394, serial, parallel, Ethernet (RJ48), RJ11, and the like, and can accept other I/O devices such as, for example, keyboards, keypads, mice, interface tethers, stylus pens, printers, thumb drives, touch screens, multi-touch screens, touch pads, trackballs, joysticks, microphones, remote control devices, monitors, displays and liquid crystal displays (LCDs), combination thereof, and the like. It should be appreciated that the I/O interface 224 can be used for communication between the device and a network or local device instead of, or in addition to, the communications component 216.

Audio capabilities may be provided by an audio I/O component 226 that may include a speaker for the output of audio signals, e.g., audible targeted content and/or caller ids, and a microphone to collect audio signals. The device 110 can include a slot interface 228 for accommodating a subscriber identity system 230 such as, for example, a subscriber identity module (SIM) or universal SIM (USIM). The subscriber identity system 230 instead can be manufactured into the device 110, thereby obviating the need for a slot interface 228. In some embodiments, the subscriber identity system 230 can store certain features, user characteristics, rules, policies, models, contact information, and the like. The subscriber identity system 230 can be programmed by a manufacturer, a retailer, a user, a computer, a network operator, and the like.

The device 110 can further include an image capture and processing system 232 (image system). Photos and/or videos can be obtained via an associated image capture subsystem of the image system 232, for example, a camera. The device 110 may also include a video system 234 for capturing, processing, recording, modifying, and or transmitting video content.

A location component 236 may be included to send and/or receive signals such as, for example, GPS data, A-GPS data, WIF/WIMAX and or cellular network triangulation data, combinations thereof, and the like. The location component 236 can interface with cellular network nodes, telephone lines, satellites, location transmitters and/or beacons, wireless network transmitters and receivers, for example, WIFI hotspots, radio transmitters, combinations thereof and the like. The device 110 may obtain, generate, and/or receive data to identify its location or can transmit data used by other devices to determine the device 110 location. The location of the device 110 can be provided to the MVVCS 130 and used to determine targeted content to provide to the device 110, in addition to content of a return communication.

The device 110 may also include a power source 238, such as batteries and/or other power subsystems (AC or DC). The power source 238 can interface with an exemplary power system or charging equipment via a power I/O component 240.

FIGS. 3A and 3B illustrate exemplary user interfaces for notifying a user of a communication device of a missed call and enabling the user to select a pricing option for a return communication. FIG. 3A illustrates a missed call list 310 which notifies the user of missed calls. The missed calls are indicated by a caller ID, a phone number, and a date/time of call. CBF and CBC options are provided in the list 310. By selecting the CBF or the CBC option, a return call is initiated to the callee(s) for a predetermined amount of time, and targeted advertisement(s) are provided to the caller and/or callee(s). If, instead, the caller wishes to pay for a return call, the caller may initiate the call without having to receive targeted content.

FIG. 3B illustrates a contact list 320 which may be used to return missed calls. The contact list includes not only the phone number of the missed call but also other contact information for the callee(s). Thus, the caller may select to return the communication to any of the phone numbers of the callee(s) by selecting the CBF or CBC.

According to an exemplary embodiment, the CBF and CBC options may be associated with all missed calls or only calls from parties who have opted-in for the targeted content service. In the contacts list, the CBF and CBC options may be associated with the callers of the missed calls in a history. The CBC and CBF options disappear as history is cleared automatically or manually.

According to exemplary embodiments, there are various scenarios for providing targeted content including, e.g., audio and/or video advertisements, to the caller and/or callee(s), after notification of a missed call. These scenarios include providing targeted content for voice calls, video calls, and voice/video calls.

First, consider a voice call. The users of a voice call may be presented with CallerID text and/or a special ringtone indicating the return call.

In one scenario, a caller is presented with an audio ad but the callee(s) are not. In this scenario, the caller first selects the CBC or CBF option, The caller can be muted while being presented with a targeted audio advertisement while being muted. Then, the caller is unmuted if previously muted, and the callee(s) are dialed, and the caller and callee(s) are connected into a voice call for a predetermined amount of time. In this scenario, there is no targeted advertisement presented to the callee(s).

In a similar scenario, a callee is presented with an audio ad but the caller is not. In this scenario, the caller selects the CBC or CBF option, and the callee(s) are dialed. The callee(s) can be muted while being presented with a targeted audio advertisement. Once the audio advertisement is complete, the callee(s) are unmuted, if previously muted, and the voice call proceeds or continues for a predetermined amount of time.

In another scenario, the caller and the callee(s) are presented with the same audio ad. In this scenario, the caller selects the CBC or CBF option, and the callee(s) are dialed. The caller and callee(s) could both be muted while being presented with a targeted audio advertisement. Once the audio advertisement is complete, the caller and callee(s) are unmuted, if previously muted, and the voice call proceeds or continues for a predetermined amount of time.

In yet another scenario, the caller and callee(s) are presented with individually targeted ads. In this scenario, the caller first selects the CBC or CBF option. The callee(s) are dialed while both caller and callee(s) are muted. The caller and callee(s) listen to the individually targeted content and are then unmuted into a voice call for a predetermined amount of time.

In another scenario, the caller and/or callee(s) in a voice are presented with all or part of an audio ad in the background of a voice call. In this scenario, the caller first selects the CBC or CBF option, and the callee(s) are dialed. The caller and/or callee(s) may be muted while being presented with part of the targeted audio advertisement. The caller and callee(s) may be unmuted while the audio advertisement continues to play. As an alternative, the audio advertisement may be provided in the background without muting the caller and/or callee(s). In either case, the voice call may continue with the audio advertisement in the background for a predetermined amount of time.

In addition to the audio advertisements described above, text and/or video advertisements may be presented to the caller and/or callee during an audio call.

Now consider a video call. The users of a video call may be presented with a "talking head" or image as a video Caller ID, along with text and/or a special ringtone indicating the return call.

In one scenario, the caller is presented with a video/audio ad, but the callee(s) are not. In this scenario, the caller selects the CBC or CBF option. The caller is presented with a targeted audio/video advertisement while no call content is transmitted. Then, the callee(s) are dialed and conferenced into voice/video call for a predetermined amount of time. In this scenario, there is no targeted advertisement for the callee(s).

In a similar scenario, the callee is presented with an ad, but the caller is not. In this scenario, the caller selects the CBC of CBF option, and the call is initiated. The callee(s) are presented with the ad, but there is no ad for the caller.

In another scenario, the caller and callee(s) are presented with the same video/audio ad. The caller selects CBC or CBF option, and the callee(s) are dialed. The caller and callee(s) are presented with the same video/audio advertisement with no video/audio call content transmitted. After the advertisement is complete, the caller and callee(s) are connected into voice/video call for a predetermined amount of time.

In another scenario, the caller and callee(s) are presented with individually targeted video/audio ads. In this scenario, the caller selects the CBC or CBF option, and the callee(s) are dialed. The caller and callee(s) are presented with individually targeted video/audio advertisements with no video/audio call content transmitted. After the advertisements are complete, the caller and callee(s) are connected into a voice/video call for predetermined amount of time.

In yet another scenario, the caller and callee(s) are presented with a video/audio ad for part of a video/audio call. In this scenario, the caller selects the CBC or CBF option, and the callee(s) are dialed. The caller and callee(s) are presented with the same video/audio advertisement with no video/audio call content transmitted. While the video/audio advertisement continues to play in background, the caller and callee(s) are connected into a voice/video call. Alternatively, the video/audio advertisement may be presented in the background, e.g., in a picture-in-picture format, for the entire duration of the advertisement. Once the advertisement is complete, the call continues for a predetermined amount of time.

For the audio and video call scenarios described above, there may be a caller id presented to the caller and/or callee(s). For example, for an audio call, there may be an audible caller id announcement. For a video call, there may be a video caller id display, e.g., a moving video or a still video. Also, there may be a picture/video overlay of caller and callee(s) video caller ids at the time of receiving the call or in video advertisements.

For the audio and video call scenarios described, at the end of the predetermined time, the call is suspended, e.g., with an audible beep, and the caller and/or callee(s) is presented with a missed call application popup and/or audio prompt to select from to continue the call. The caller and/or callee may continue the video call by paying a fee, continue the video call in exchange for listening to one or more audio/video advertisements by caller and/or callee(s), or drop the call.

In each of the scenarios described above, content may be targeted based on various factors, such as a location of a caller, a location of a callee, the type of call (audio and/or video), content of the call, the time of the missed call, characteristics of the caller and/or callee (e.g., age, gender, social interests, shopping preferences, residential area, etc.), and the time of the return call. For example, for a video call, the video content of the call presented to the caller and/or callee(s) may be augmented with a picture overlay of advertisements based on, e.g., a location of the caller and/or a location of the callee(s). In another example, video content of the call may be augmented with a picture overlay of advertisements based on location(s) of the caller/callee, time of day, and activities of caller and/or callee(s). For example, at lunchtime or dinner time, restaurant deals and evening movie deals in the area may be presented. As another example, call content may be augmented with a picture overlay of the store advertisements based on the location of callers and callee(s). For example, when the caller is in NYC Times Square, the video presented to the caller may be augmented with ads from stores around Times Square. In another scenario, augmented reality video may be presented with controls to stop, zoom, and continue video by callers and callee(s).

Figure 4:
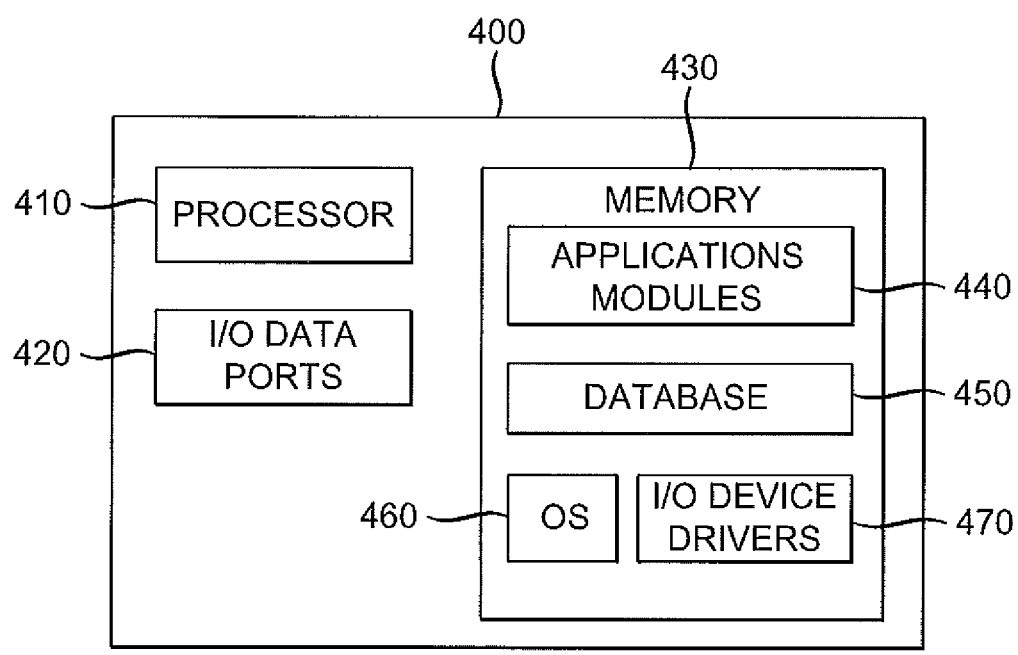
FIG. 4 illustrates an exemplary device for determining targeted content to provide responsive to a missed communication according to an exemplary embodiment.

FIG. 4 is a block diagram of a device 400 by which a MVVCS 130 may be implemented according to an exemplary embodiment. The device 400 includes a processor 410 that receives information, such as selections of pricing options for return communications via I/O data ports 420. The I/O data ports 420 can be implemented with, e.g., an interface including an antenna or other suitable type of transceiver through which data and signals may be transmitted and received. It should be appreciated that the I/O data ports 420 can be used for communications with, e.g., the communication device 110A, 110B, 110C, and 110D, targeted content provider 140, and other network operators.

The processor 410 communicates with a memory 430 via, e.g., an address/data bus (not shown). The processor 410 can be any commercially available or customer processor. The memory 430 is representative of the overall hierarchy of memory devices containing the software and data used to implement the functionality of the device 400. The memory 430 can include, but is not limited to, the following types of devices: processor registers, processor cache, RAM, ROM, PROM, EPROM, EEPROM, flash memory, SRAMD, DRAM, other volatile memory forms, and non-volatile, semi-permanent or permanent memory types; for example, tape-based media, optical media, solid state media, hard disks, combinations thereof, and the like.

As shown in FIG. 4, the memory 430 may include several categories of software and data used in the device 400, including, applications 440, a database 450, an operating system (OS) 460, and the input/output (110) device drivers 470. As will be appreciated by those skilled in the art, the OS 460 may be any operating system for use with a data processing system. The I/O device drivers 470 may include various routines accessed through the OS 460 by the applications 440 to communicate with devices, and certain memory components. The applications 440 can be stored in the memory 430 and/or in a firmware (not shown) as executable instructions, and can be executed by the processor 410. The applications 440 include various programs that, when executed by the processor 410, implement the various features of the device 400, including determining targeted content to provide for a return communication. The applications 440 may be applied to data stored in the database 450, e.g., user profile data, along with data, e.g., received via the I/O data ports 420, e.g., location-based data. The database 450 represents the static and dynamic data used by the applications 440, the OS 460, the I/O device drivers 470 and other software programs that may reside in the memory.

While the memory 430 is illustrated as residing proximate the processor 410, it should be understood that at least a portion of the memory 430 can be a remotely accessed storage system, for example, a server on a communication network, a remote hard disk drive, a removable storage medium, combinations thereof, and the like. Thus, any of the data, applications, and/or software described above can be stored within the memory 430 and/or accessed via network connections to other data processing systems (not shown) that may include a local area network (LAN), a metropolitan area network (MAN), or a wide area network (WAN), for example.

It should be understood that FIG. 4 and the description above are intended to provide a brief, general description of a suitable environment in which the various aspects of some embodiments of the present disclosure can be implemented. While the description refers to computer-readable instructions, embodiments of the present disclosure also can be implemented in combination with other program modules and/or as a combination of hardware and software in addition to, or instead of, computer readable instructions. The term "application," or variants thereof, is used expansively herein to include routines, program modules, programs, components, data structures, algorithms, and the like. Applications can be implemented on various system configurations, including single-processor or multiprocessor systems, mini-computers, mainframe computers, personal computers, hand-held computing devices, microprocessor-based, programmable consumer electronics, combinations thereof, and the like.

Figure 5:
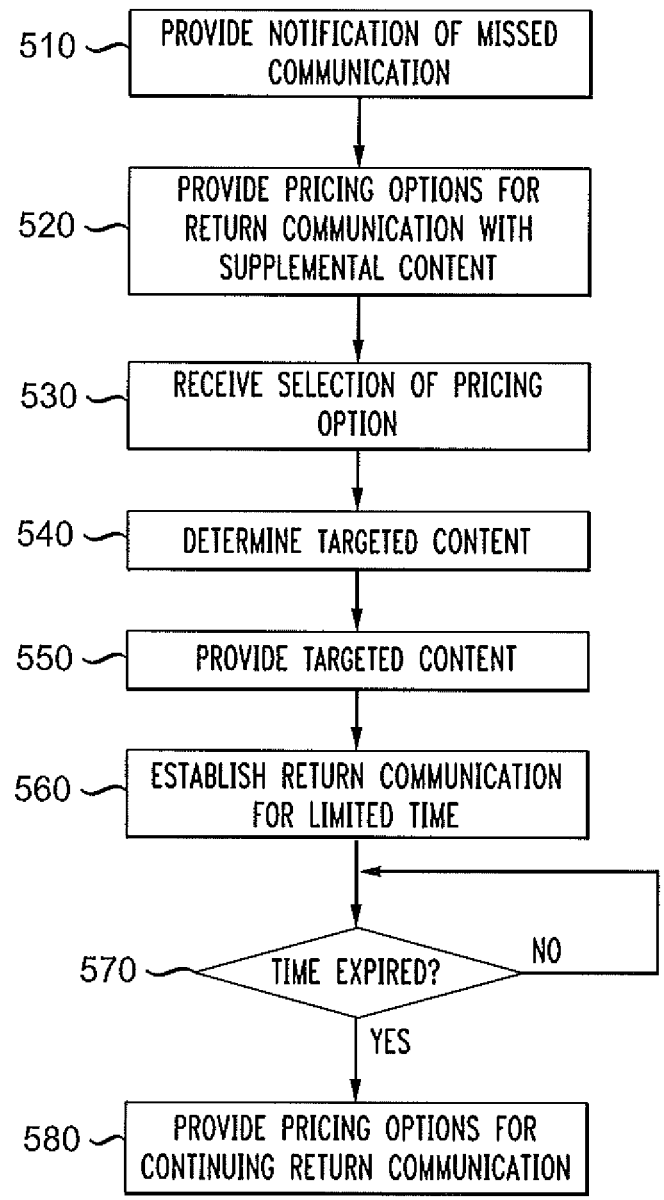
FIG. 5 illustrates a method for determining targeted content to provide responsive to a missed communication according to an exemplary embodiment.

FIG. 5 illustrates a method for determining targeted content to provide responsive to a missed communication according to an exemplary embodiment. It should be understood that the steps or other interactions of the illustrated method are not necessarily presented in any particular order and that performance of some or all the steps in an alternative order is possible and is contemplated. The steps have been presented in the demonstrated order for ease of description and illustration. Steps can be added, omitted and/or performed simultaneously without departing from the scope of the appended claims. It should also be understood that the method can be ended at any time. In certain embodiments, some or all steps of the method, and/or substantially equivalent steps can be performed by execution of computer-executable instructions stored or included on a non-transitory computer-readable medium.

Referring to FIG. 5, at step 510 a notification of a missed communication is provided to a communication device, e.g., communication device 110, by the MVVCS 130. The notification may be in the form of a missed call notification, a missed call list, a highlighted telephone number in a contacts list, etc. Pricing options for a return communication are provided at step 520. The pricing options may include a free return call, a collect return call, or a pay return call. The pricing options may be set in advance, e.g., as buttons on the phone, and/or may be provided on-the-fly by the MVVCS 130, e.g., by the user calling a predetermined telephone number. A selection of a pricing option is received from the device initiating the return communication at step 530, e.g., by the MVVCS 130. At step 540, targeted content to provide to the caller and/or callee(s) is determined by the MVVCS 130 based on the selected pricing option, among other factors described above. If the call is a pay call, the MVVCS 130 may determine not to provide targeted content, or may provide a discount to the caller for a limited amount of targeted content. At step 550, targeted content is provided by the MVVCS 130 to the caller and/or callee(s). At step 560, the return communication is established for a predetermined time. It should be appreciated that the targeted content may be provided after the call is established or before the call is established.

At step 570, a determination is made as to whether the predetermined time allotted for the return call has expired. If not, the call continues. If the allotted time has expired, options are provided for continuing the return communication at step 580. The options may include, e.g., continuing the call with additional targeted advertisements, charging the caller and/or callee for continuing the call, or dropping the call. In one embodiment, the option is presented to the caller, and the choice made by the caller. In one embodiment, the option is presented to the caller, and the choice made by the callee. In one embodiment, the option is presented to both the caller and calle, and the choice may be made by either the caller or the callee. If either selects to continue the call with additional targeted advertisements, targeted advertisements similar to those already provided may be sent, and/or the process may return to step 550.

The law does not require and it is economically prohibitive to illustrate and teach every possible embodiment of the present claims. Hence, the above-described embodiments are merely exemplary illustrations of implementations set forth for a clear understanding of the principles of the invention. Variations, modifications, and combinations may be made to the above-described embodiments without departing from the scope of the claims. All such variations, modifications, and combinations are included herein by the scope of this disclosure and the following claims.

What is claimed is:

1. A method, comprising:
   receiving, by a first communication device, a notification of a missed communication from a second communication device;
   receiving, by the first communication device, a selection of a pricing option among a plurality of different pricing options provided to the first communication device for establishing a return communication between the first communication device and the second communication device;
   initiating the return communication between the first communication device and the second communication device, wherein the return communication is established for a predetermined amount of time, wherein at least one of the first communication device and second communication device receives targeted content, in addition to content of the return communication, based on the selected pricing option, and wherein upon expiration of the predetermined amount of time for the return communication, a plurality of different pricing options are provided for continuing the return communication.

2. The method of claim 1, wherein the targeted content includes an advertisement, and the content of the return communication includes at least one of audio content and video content.

3. The method of claim 1, wherein the pricing options include no charge for the return communication.

4. The method of claim 1, wherein the pricing options include charging the second communication device for the return communication.

5. A communication device, comprising:
   a processor; and
   a memory having stored thereon computer-readable instructions which, when executed by the processor, cause the processor to perform operations comprising:
   receiving a notification of a missed communication from another communication device;
   receiving a selection of a pricing option among a plurality of different pricing options provided to the communication device for establishing a return communication with the other communication device;
   initiating the return communication with the other communication device, wherein the return communication is established for a predetermined amount of time, wherein at least one of the communication devices receives targeted content, in addition to content of the return communication, based on the selected pricing option, and wherein upon expiration of the predetermined amount of time for the return communication, a plurality of different pricing options are provided for continuing the return communication.

6. The communication device of claim 5, wherein upon expiration of the predetermined amount of time for the return communication, the plurality of different pricing options are provided to the communication device for continuing the return communication.

7. The communication device of claim 5, wherein upon expiration of the predetermined amount of time for the return communication, the plurality of different pricing options are provided to the other communication device for continuing the return communication.

8. The communication device of claim 5, wherein the targeted content includes an advertisement, and the content of the return communication includes at least one of audio content and video content.

9. The communication device of claim 5, wherein the pricing options include no charge for the return communication.

10. The communication device of claim 5, wherein the pricing options include charging the other communication device for the return communication.

11. The communication device of claim 5, wherein the targeted content is further based on a location of at least one of the communication devices.

12. The communication device of claim 5, wherein the targeted content is further based on a user profile of a user of at least one of the communication devices.

13. The communication device of claim 5, wherein the targeted content is further based on at least one of a time of the missed communication and a time of the return communication.

14. The communication device of claim 5, wherein the targeted content is further based on at least one of the content of the missed communication and the content of the return communication.

15. A non-transitory computer readable storage device having instructions recorded thereon which, when executed by a processor within a communication device, cause the perform operations s comprising:
   receiving a notification of a missed communication from another communication device;
   receiving a selection of a pricing option among a plurality of different pricing options provided to the communication device for establishing a return communication with the other communication device;
   initiating the return communication with the other communication device, wherein the return communication is established for a predetermined amount of time, wherein at least one of the communication devices receives targeted content, in addition to content of the return communication, based on the selected pricing option, and wherein upon expiration of the predetermined amount of time for the return communication, a plurality of different pricing options are provided for continuing the return communication.

16. The non-transitory computer readable storage device of claim 15, wherein the targeted content includes an advertisement, and the content of the return communication includes at least one of audio content and video content.

17. The non-transitory computer readable storage device of claim 15, wherein the pricing options include no charge for the return communication.

18. The non-transitory computer readable storage device of claim 15, wherein the pricing options include charging the other communication device for the return communication.

19. The non-transitory computer readable storage device of claim 15, wherein the targeted content is further based on at least one of a location of at least one of the communication devices and a user profile of a user of at least one of the communication devices.

20. The non-transitory computer readable storage device of claim 15, wherein the targeted content is further based on at least one of a time of the missed communication, a time of the return communication, a content of the missed communication and the content of the return communication.

* * * * *